United States Patent [19]

Tran

[11] Patent Number: 5,345,569
[45] Date of Patent: Sep. 6, 1994

[54] APPARATUS AND METHOD FOR RESOLVING DEPENDENCIES AMONG A PLURALITY OF INSTRUCTIONS WITHIN A STORAGE DEVICE

[75] Inventor: Thang M. Tran, Austin, Tex.

[73] Assignee: Advanced Micro Devices, Inc., Sunnyvale, Calif.

[21] Appl. No.: 764,155

[22] Filed: Sep. 20, 1991

[51] Int. Cl.5 .................................................. G06F 9/06
[52] U.S. Cl. .............................. 395/375; 364/DIG. 2; 364/933.6; 364/947.2; 364/946.2
[58] Field of Search ........................................ 395/375; 364/DIG. 1 MS File, DIG. 2 MS File

[56] References Cited

U.S. PATENT DOCUMENTS 4,714,994 12/1987 Oklobdzija et al. ................. 395/375
4,879,646 11/1989 Iwasaki et al. ...................... 395/375
5,226,126 7/1993 McFarland et al. ................. 395/375

Primary Examiner—Thomas M. Heckler
Attorney, Agent, or Firm—Foley & Lardner

[57] ABSTRACT

An apparatus and method for resolving data dependencies among a plurality of instructions within a storage device, such as a reorder buffer in a superscalar computing apparatus employing pipeline instruction processing. The storage device has a read pointer, indicating a most recently-stored instruction and has a write pointer, indicating a first-stored instruction of the plurality of instructions within the storage device.

A compare-hit circuit generates a compare-hit signal upon each concurrence of the respective source indicator in a next-to-be-dispatched instruction with the destination indicator of an earlier-stored instruction within the storage device; a first enable circuit generates a first enable signal for a first packet of instructions defined by the read pointer and the write pointer; a first comparing circuit generates a hit-enable signal for each concurrence of the compare-hit signal and the first enable signal; a second enable circuit generates a second enable signal for a second packet of instructions defined by the read pointer and the hit-enable signal; and a second comparing circuit generates the output signal for each concurrence of the second enable signal and the hit-enable signal.

12 Claims, 4 Drawing Sheets

| | 9 | 8 | 7 | 6 | 5 | 4 | 3 | 2 | 1 | 0 | REGISTER NUMBER |
|---|---|---|---|---|---|---|---|---|---|---|---|
| | MOST RECENTLY STORED | | | | | | | | | EARLIEST STORED | |
| | R₁ | R₁ | R₁ | R₁ | R₁ | R₁ | R₁ | R₁ | R₁ | R₁ | DESTINATION POINTER |
| | 0 | 0 | 0 | 0 | — | — | — | — | 0 | 0 | ALLOCATED |
| | | | | ↑RP | | | | ↑WP | | | |
| A | 0 | 0 | 0 | — | 0 | 0 | 0 | 0 | 0 | 0 | REAL POINTER |
| B | 0 | 0 | 0 | 0 | 0 | 0 | 0 | — | 0 | 0 | WRITE POINTER |
| C | 0 | 0 | 0 | 0 | — | — | — | — | 0 | 0 | COMPARE-HIT |
| D | 0 | — | 0 | 0 | 0 | — | 0 | — | 0 | — | COMPARE-HIT |
| E | 0 | 0 | 0 | 0 | 0 | — | 0 | — | 0 | 0 | AND(1ST) |
| F | 0 | 0 | 0 | 0 | — | — | 0 | 0 | 0 | 0 | ENABLE FROM READ POINTER TO FIRST HIT |
| G | 0 | 0 | 0 | 0 | 0 | — | 0 | 0 | 0 | 0 | AND(2ND) |

APPARATUS AND METHOD FOR RESOLVING DEPENDENCIES AMONG A PLURALITY OF INSTRUCTIONS WITHIN A STORAGE DEVICE

BACKGROUND OF THE INVENTION

In a superscalar computing apparatus using a reservation technique for handling data dependencies, a reorder buffer is commonly used to keep track of dispatched instructions and retired instructions in appropriate order. One major function of such a reorder buffer is to check the instruction operands during decoding for possible matches between dispatched read operands and destination operands of previous instructions in the reorder buffer. If such a match is detected, then a tag identifying the matched destination operand will be sent along with the read operand of the dispatched instruction to the reservation station. By means of such tag, the reservation station may check the results bus from the functional units for data returning to the reorder buffer and on detection of the appropriate tag, can directly receive the result for immediate processing.

The reorder buffer commonly has a write pointer which identifies the first instruction in the pipe line within the reorder buffer, and a read pointer which points to the entry after the last instruction in the pipeline. Reorder buffers are commonly loop first-in-first-out (FIFO) registers which if full or empty result in the read and write pointer pointing to the same entry. Such data processing requirements are necessary for a superscalar computing apparatus employing a pipelined instruction processing technique. Typically in such a computing apparatus a fetch-batch of a plurality of instructions is processed during each cycle. A design goal for such apparata is to dispatch and execute multiple instructions per cycle, but impediments to reaching that design goal are encountered in the event of data dependencies among instructions or branch instructions.

An instruction dependent upon data to be calculated by a different instruction cannot begin its operation until its required operands are available. If an operand is calculated by a previous instruction, then the second instruction must wait until the previous instruction has completed execution; thus, data dependencies among instructions can delay execution of instructions and degrade operation of the computing apparatus. Branch instructions may also degrade operation of the computing apparatus since such instructions often must wait for a condition to be known before executing. Both of these problems (data dependencies and branch instructions) may result in halting the flow of instructions within a superscalar system employing a pipeline instruction processing technique. The flow of instructions may also be disrupted by "interrupts" and "traps". Interrupts and traps are words reserved for extraordinary causes of stopping the normal execution of the instruction stream. Interrupts and traps can be occasioned by external pins that are user-asserted, illegal instructions, preset traces, stopping points, memory errors or other causes. The processor must store the current conditions, processor states, and the address of the current instruction to service a trap or interrupt (another sequence of instructions). After completion of the trap/interrupt routine, the processor must return to normal execution of the instruction stream. Interrupts and traps can be imprecise in their occurrences, and the reorder buffer must keep track of the instruction stream for proper stopping and restarting of normal instruction execution.

The present invention provides an apparatus and method for resolving such data dependencies and other interruptions among a plurality of instructions within a storage device such as a reorder buffer. The present invention is particularly useful in a superscalar computing apparatus employing pipeline instruction processing.

SUMMARY OF THE INVENTION

The invention is an apparatus and method for resolving data dependencies among a plurality of instructions within a storage device, such as a reorder buffer in a superscalar computing apparatus employing pipeline instruction processing. The apparatus is employable with a storage device having a plurality of memory, or register, cells, and is especially employable in a storage device operating in a loop first-in-first-out (FIFO) mode. The storage device has a read pointer, indicating a next-empty memory cell within the storage device, and has a write pointer, indicating a first instruction in the pipe of the plurality of instructions within the storage device. Each of the plurality of instructions effects an operational combination of a plurality of operands to determine a result. Each of the plurality of operands is identified by a source indicator, and the result is identified by a destination indicator. The apparatus generates an output signal which identifies the most recently-stored instruction of the plurality of instructions within the storage device which has the destination indicator matching a respective source indicator of the next-to-be-dispatched instruction.

Dispatching an instruction means that the instruction is sent from the decoder to a functional unit and the reorder buffer. As the instruction is dispatched, a location is allocated in the reorder buffer. The write pointer points to the first allocated instruction in the reorder buffer, and the read pointer points to the next-empty location in the reorder buffer for the next-to-be-dispatched instruction. The allocated entries in the reorder buffer indicate that the instructions associated with the allocated entries are in functional units; these instructions are either being executed or waiting in a reservation station to be executed. The instructions must be dispatched "in-order" from the decoder to establish an instruction stream. In order not to keep the instruction stream from advancing (thus reducing performance), it is important that the reorder buffer must check dependencies among instructions and let the decoder dispatch instructions as soon as possible. As an instruction is completed in its execution by a functional unit, the result of such execution is sent back to the reorder buffer, the allocated entry is then marked as valid. The major function of the reorder buffer is to update the result correctly from the write pointer "in-order" (first-in-first-out) with the valid-allocated entry. The reorder buffer also unallocates the location in the reorder buffer and increases the write pointer. In the processor of the present invention, instructions are dispatched "in-order" by the decoder as allowed by the reorder buffer. In functional units, the instructions are executed and returned to the reorder buffer "out-of-order". The reorder buffer then updates the results (register file and processor states) "in-order". The reorder buffer reconciles all dependencies before the instructions can be dispatched.

The apparatus comprises a compare-hit circuit for generating a compare-hit signal upon each concurrence of the respective source indicator in the next-to-be-dispatched instruction with the destination indicator of an earlierstored instruction within the storage device; a first enable circuit for generating a first enable signal for a first packet of instructions of the plurality of instructions, which first packet of instructions is defined by the read pointer and the write pointer; a first comparing circuit for generating a hit-enable signal for each concurrence of the compare-hit signal and the first enable signal; a second enable circuit for generating a second enable signal for a second packet of instructions, which second packet of instructions is defined by the read pointer and the hit-enable signal; and a second comparing circuit for generating the output signal for each concurrence of the second enable signal and the hit-enable signal.

In its preferred embodiment, the first enable circuit and the second enable circuit are of substantially the same configuration, and the first comparing circuit and second comparing circuit are of substantially the same configuration.

The invention also comprises a method for resolving data dependencies among a plurality of instructions within a storage device such as a reorder buffer in a superscalar computing apparatus employing a pipeline instruction handling technique. The method comprises the steps of (1) comparing each of the respective source indicators in next-to-be dispatched instructions with a destination indicator of an earlier-stored instruction within the storage device; (2) generating a compare-hit signal upon each concurrence of the respective source indicator of the next-to-be dispatched instruction with the destination indicator of an earlierstored instruction; (3) generating a first enable signal for a first packet of instructions, which first packet of instructions is defined by the read pointer and the write pointer; (4) comparing the compare-hit signal with the first enable signal;. (5) generating a hit-enable signal for each concurrence of the compare-hit signal and the first enable signal; (6) generating a second enable signal for a second packet of instructions, which second packet of instructions is defined by the read pointer and the hit-enable signal; (7) comparing the second enable signal with the hit-enable signal; (8) and generating an output signal for each concurrence of the second enable signal and the hit-enable signal. The output signal identifies the most recently-stored instruction of the plurality of instructions within the storage device having the destination indicator matching a respective source indicator of the next-to-be dispatched instruction.

It is therefore an object of the present invention to provide an apparatus and method for resolving data dependencies among a plurality of instructions within a storage device which efficiently identify matches between dispatched read operands and destination operands of previous instructions in a storage device.

A further object of the present invention is to provide an apparatus and method for resolving data dependencies among a plurality of instructions within a storage device which provide a tag identifying matched destination operands for use by a dispatched instruction, which tag accompanies a dispatched instruction.

Yet a further object of the present invention is to provide an apparatus for resolving data dependencies among a plurality of instructions within a storage device which is simple in construction and provides reliability and durability in its operation by employing similar circuitry for separate functions.

Further objects and features of the present invention will be apparent from the following specification and claims when considered in connection with the accompanying drawings illustrating the preferred embodiment of the invention.

DETAILED DESCRIPTION OF THE DRAWINGS

DETAILED DESCRIPTION OF THE INVENTION

Figure 1:
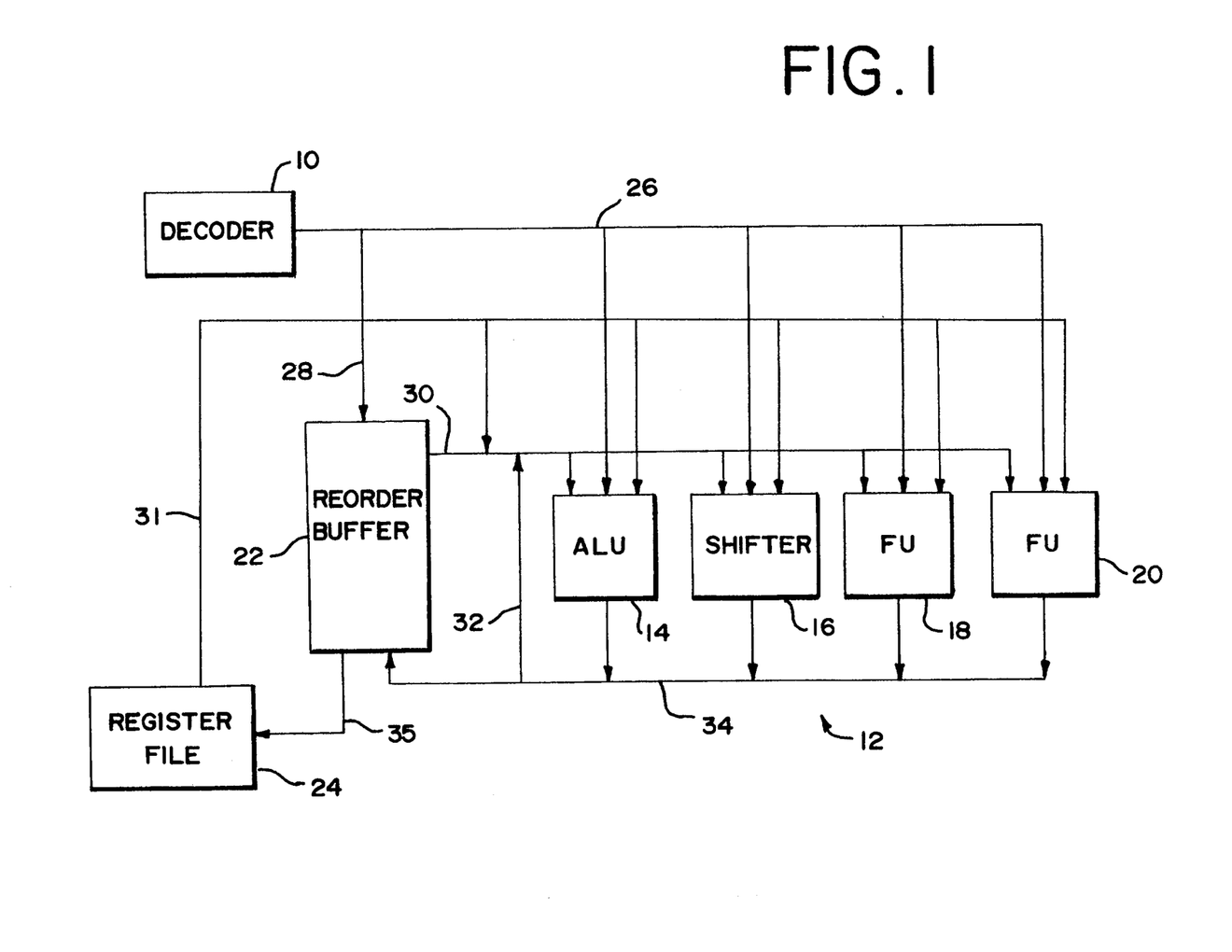
FIG. 1 is a schematic diagram of a computing apparatus employing a reorder buffer of the type intended for use with the apparatuses and method of the present invention.

FIG. 1 is a schematic diagram of a computing apparatus employing a reorder buffer of the type intended for use with the apparatus and method of the present invention. Preferably, the apparatus illustrated in FIG. 1 is a superscalar computing apparatus using a queueing technique for handling data dependencies and employing a pipeline instruction processing technique.

Accordingly, in FIG. 1, a decoder 10 issues a fetch-batch of instructions (preferably a batch of four instructions) for processing by appropriate processing units 12. Depending upon the type of operation to be performed by a respective instruction, the instruction may be routed to an arithmetic logic unit (ALU) 14, a shifter 16, or a functional unit (FU) 18, 20. Each of the instructions in a given fetch-batch is also simultaneously entered into a reorder buffer 22. Reorder buffer 22 is necessary in such a superscalar computing apparatus employing pipeline instruction processing to account for interrupts in instruction processing which may be occasioned by inter-instruction data dependencies, or branch instructions or other causes. That is, the result of a given instruction may be required as an operand for a subsequent instruction, or a branch instruction may need to wait for resolution of a condition of the branch updating the register file. Of course, a branch instruction may involve read operands which have a data dependency just as may occur in any other instruction. A conditional branch instruction, for example, can jump to another instruction stream or continue the current instruction stream. The result of a conditional branch instruction is not known until it is executed by a functional unit and the result of its execution is returned to the reorder buffer. In the preferred embodiment of the present invention, the processor makes an intelligent guess regarding the result of a branch instruction and continues to fetch instructions from the instruction stream into the decoder. If the guess of the branch outcome is incorrect, the reorder buffer will purge the incorrect instructions which were stored after the branch instruction and a new instruction stream is fetched. Branch instructions are then executed using a valid-allocated entry in the reorder buffer.

When the program which is executed by the superscalar computer illustrated in FIG. 1 is prepared, each instruction in the program includes information regarding which address of register file 24 will receive the result of the operation performed by the respective instruction. Also included for each instruction is information regarding from which register address operands required for execution of that particular instruction will be received.

That is, decoder 10 sends the source operands to register file 24 to request that data be sent to a functional unit 12 via line 31. If a match occurs between the source operand and the previous-stored destination operand in reorder buffer 22 and the data is valid, then reorder buffer 22 will supply the data to an appropriate functional unit 12 via line 30 instead of the data being supplied from register file 24. If a match occurs between the source operand and the previous-stored destination operand in reorder buffer 22 and the data is not valid, then no data will be sent to a functional unit 12. Instead, a tag will be sent to the reservation station (not shown) of the appropriate functional unit 12. The reservation station will watch result bus 34 from functional units 12 for data which has the tag which matches the reservation station's tag. The data associated with the matching tag will be forwarded from bus 34 to bus 30 via bus 32. Information sent by decoder 10 via line 26 to functional units 12 is related to the type of instruction. Instructions are dispatched (or issued) by decoder 10 with the help of reorder buffer 22 for dependency checking.

In a computing apparatus such as that illustrated in FIG. 1, each respective processing unit 12 generally has a queueing apparatus of some sort such as a reservation station, or the like. Accordingly, instructions issuing from decoder 10 on line 26 to respective processing units 12 which carry an identifier for identifying a needed result can effect matching of the respective needy instruction with its required result by that identifying information from reorder buffer 22 or from output line 34 through lines 30, 32 to the appropriate reservation station or other queueing apparatus where the needy instruction is held.

Instructions are executed by functional units 12 and returned to reorder buffer 22 "out-of-order". Reorder buffer 22 then updates register file 24 via line 35 "in-order".

In order to facilitate understanding of the invention, like elements will be identified by like reference numerals in the various drawings.

Figure 2:
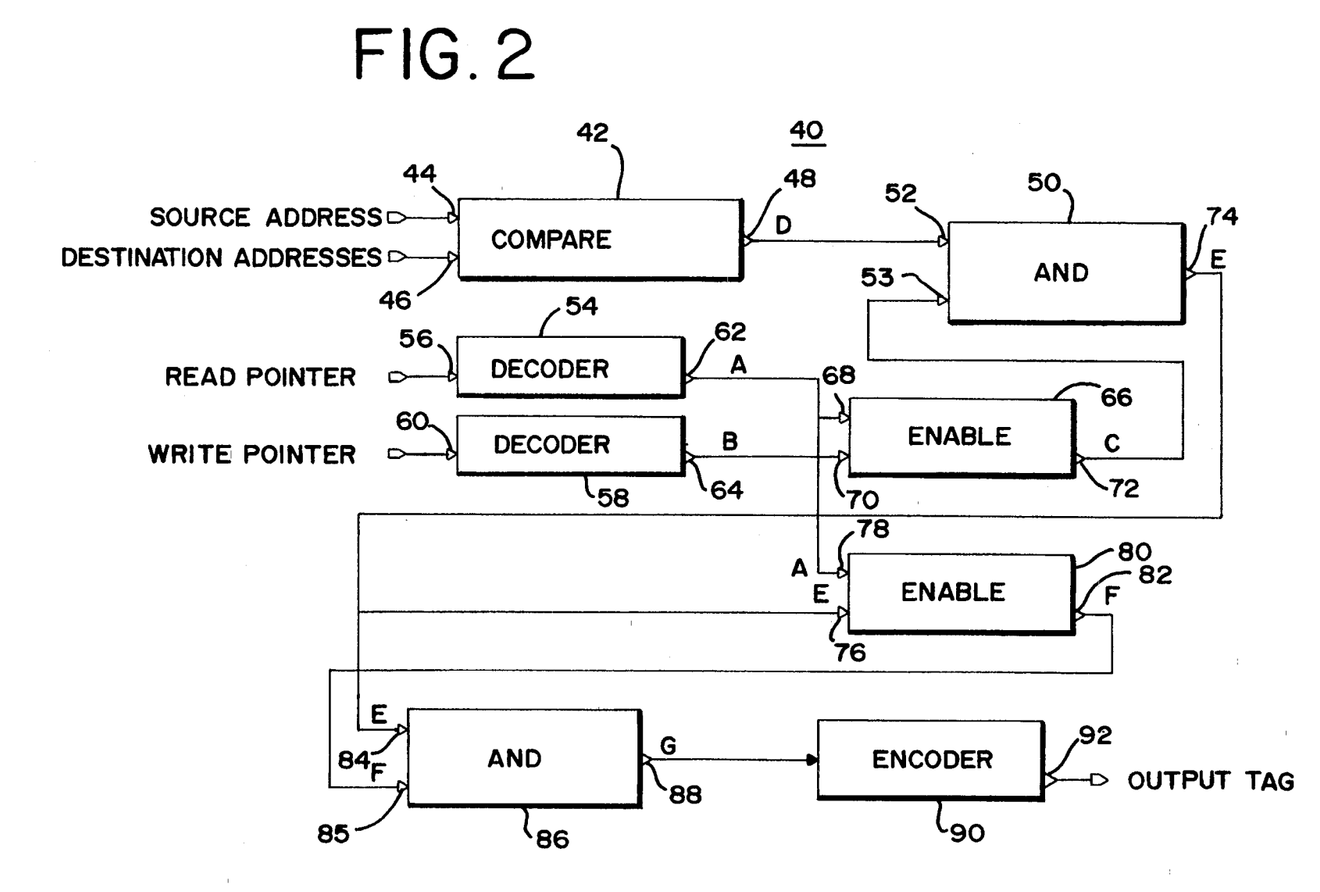
FIG. 2 is a schematic block diagram of the apparatus of the present invention.

FIG. 2 is a schematic block diagram of the apparatus of the present invention. In FIG. 2, an apparatus 40 includes a COMPARE circuit 42; decoders 54, 58; AND circuits 50, 86; ENABLE circuits 66, 80, and an encoder circuit 90. COMPARE circuit 42 receives source address information at an input 44, which source address information identifies an address in register 24 (see FIG. 1) at which information required for execution of an instruction (such as an operand) is stored. COMPARE circuit 42 also receives destination information at an input 46, which destination information identifies an address within register file 24 at which results from execution of an instruction is to be stored after execution of the respective instruction. A COMPARE-HIT signal "D" is generated at an output 48 from COMPARE circuit 42 and is received as an input 52 to AND circuit 50, thus providing information to AND circuit 50 identifying each instruction within reorder buffer 22 for which a destination address for a result from any instruction concurs with a source address for an operand of a given instruction. Decoder 54 receives at an input 56 information identifying the location of a READ pointer within reorder buffer 22 (see FIG. 1). The READ pointer identifies the next-to-be-dispatched instruction of a fetch-batch in reorder buffer 22. A WRITE pointer identifies the firststored instruction within reorder buffer 22. The WRITE pointer is received by decoder 58 at an input 60. Decoder 54 produces a signal "A" at output 62 which is decoded information regarding the READ pointer location within reorder buffer 22. Decoder 58 produces a signal "B" at output 64 which is decoded information regarding the WRITE pointer location within reorder buffer 22.

ENABLE circuit 66 receives decoded READ pointer information (signal "A") at an input 68 and receives decoded WRITE pointer information (signal "B") at an input 70. ENABLE circuit 66 generates an ENABLE signal "C" (preferably, a "1") for all entries in reorder buffer 22 between the READ pointer and the WRITE pointer. ENABLE signal "C" is provided at output 72.

AND circuit 50 receives ENABLE signal "C" from ENABLE circuit 66 at an input 53. AND circuit 50 generates an output signal "E" at an output 74 which signal "E" identifies every concurrence, or match, of source address and destination address between the READ pointer and the WRITE pointer within reorder buffer 22.

Signal "E" is applied at input 76 of ENABLE circuit 80. ENABLE circuit 80 receives at input 78 the decoded READ pointer information (signal "A"). Preferably, ENABLE circuit 80 is of the same configuration as ENABLE circuit 66. ENABLE circuit 80 produces an output signal "F" at output terminal 82. Signal "F" establishes an ENABLE signal (preferably, a "1") from the READ pointer to the first concurrence of ENABLE signal "C" and COMPARE-HIT signal "D".

AND circuit 86 receives signal "E" at an input 84 and signal "F" at an input 85. Preferably AND circuit 86 is of the same configuration as AND circuit 50. AND circuit 86 produces an output signal "G" at output terminal 88. Signal "G" identifies the most recently-stored occurrence of the result required by a respective instruction intermediate the READ pointer and the WRITE pointer within reorder buffer 22. Output signal "G" is encoded by an encoder 90 and dispatched from apparatus 40 as an OUTPUT TAG at output terminal 92.

If the OUTPUT TAG points to a valid entry in reorder buffer 22, then reorder buffer 22 will send the data to a functional unit 12 via line 30 (instead of the data being sent from register file 24). A valid entry in reorder buffer 22 means that the instruction is completed in execution by a functional unit 12 and has returned to reorder buffer 22. Because the results of an instruction must update register file 24 or processor states "in-order", the valid-entry instruction must wait for its turn. If the OUTPUT TAG points to a non-valid entry in reorder buffer 22, then the OUTPUT TAG is appropriately appended to the next-to-be-dispatched instruction to provide identification information for that instruction regarding the location of information required by that instruction for execution and to aid possible matching of that information to the instruction via line 32 from output line 34 directly to a queueing device and a respective processing unit 12, as described in connection with FIG. 1.

Figure 3:
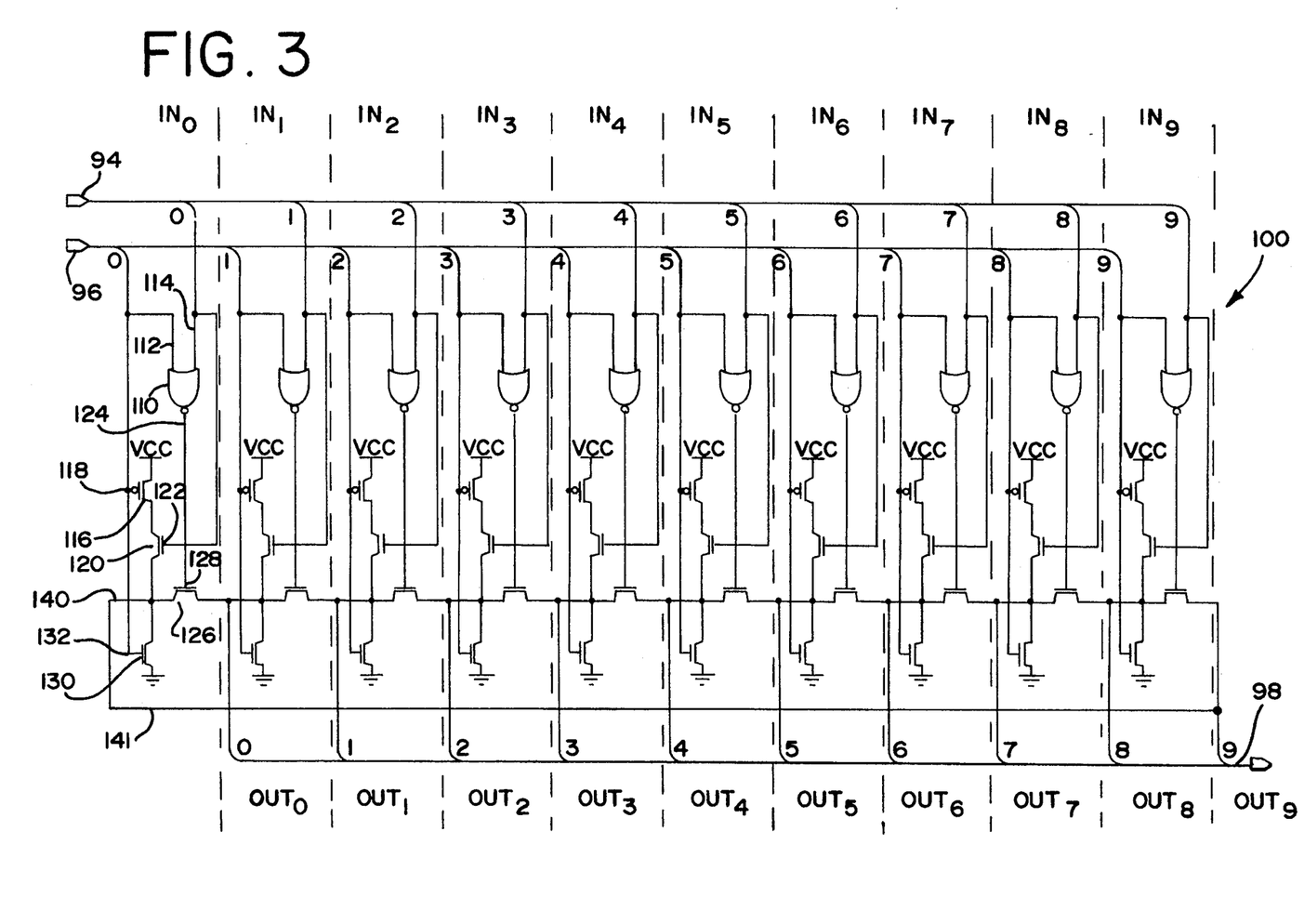
FIG. 3 is an electrical schematic diagram of the enable circuit employed by the apparatus illustrated in FIG. 2.

FIG. 3 is an electrical schematic diagram of ENABLE circuit 66, 80 employed by apparatus 40 illustrated in FIG. 2. In FIG. 3, a first input bus 94 and a second input bus 96 each delivers a ten-bit (bits 0-9) signal to ENABLE apparatus 100. Thus, ENABLE apparatus 100 comprises ten cells 0-9. Each cell is associated with a respective bit of both input bus 94 and input bus 96 so that there is an input $IN_0$-$IN_9$ for each of the cells. An output bus 98 has associated outputs $OUT_0$-$OUT_9$.

For clarity of explanation, the structure of a representative cell, cell 0, will be described in detail. Cell 0 comprises a NOR gate 110 having an input 112 from input bus 96 and an input 114 from input bus 94. A P-channel CMOS switching transistor 116 is gated by signals from input bus 96 at gate 118. P-channel switching transistor 116 gates a reference voltage VCC to an N-channel CMOS switching transistor 120. N-channel switching transistor 120 is gated at its gate 122 by signals from input bus 94. Output 124 of NOR gate 110 gates an N-channel CMOS switching transistor 126 at its gate 128. An N-channel CMOS switching transistor 130 is gated by signals from input bus 96 at its gate 132.

A common line 140 traverses all cells 0-9 and return common line 141 loops from cell 0 back to cell 9.

ENABLE apparatus 100 is configured to respond to addresses provided by input buses 94, 96 which are formatted so that only one bit of input bus 94 and only one bit of input bus 96 will have a "1" value at any given time. Thus, by way of illustration, the operation of ENABLE apparatus 100 will be explained in the case where input bus 94 has a "1" value at bit 6 and input bus 96 has a "1" value at bit 2.

In such an exemplary situation, "0" values at bits 0-5 and 7-9 on input bus 94 will result in "0" values at input 114 in each of cells 0-5 and 7-9. The "0" values of input bus 96 at cells 0-1 and cells 3-9 will result in a "0" value at input 112 for each cell 0-1, 3-9. As a consequence, outputs 124 from NOR gates 110 will have a value of "1" at cells 0-1, 3-5, and 7-9. In other words, cells 2 and 6 will have a value of "0" at output 124 of NOR gate 110.

By such configuration, N-channel switching transistors 128 will be gated off in cells 2 and 6 and gated on in all other cells in ENABLE apparatus 100. Cell 6, with its "1" value at input 114 will gate on N-channel switching transistor 120 in cell 6. Similarly, the "0" value at input 112 in cell 6 will be imposed at gate 118 of P-channel switching transistor 116 in cell 6, thereby gating on P-channel switching transistor 116, with the result that reference voltage VCC will be applied to common line 140. N-channel switching transistor 132 in cell 6 will be gated off, thereby isolating common line 140 from ground.

Signal flow on common line 140 is directional from cell 9 toward cell 0, and signal flow on return common line 141 is directional from cell 0 toward cell 9. The "0" value of inputs 114 for cells 3-5 gates off the respective N-channel switching transistors 120 for those cells 3-5, thereby isolating common line 140 from reference voltage VCC in cells 3-5. Similarly, the "0" input received from input bus 96 in cells 3-5 will gate off the respective N-channel transistors 130 for cells 3-5, thereby isolating common line 140 from ground in cells 3-5. Thus, a "1" value is applied to outputs $OUT_2$ through $OUT_5$ which is imposed by the connection of VCC to common line 140 in cell 6. A "0" value is applied to outputs $OUT_0$-$OUT_1$ and $OUT_6$-$OUT_9$. In such manner, ENABLE circuit 100 imposes an ENABLE signal (a "1" value) intermediate the two "1" values present at input buses 94 and 96, respectively.

In cell 2, the "0" value at input 114 gates off N-channel switching transistor 120, thereby isolating common line 140 from reference voltage VCC, and similar results occur in cells 0-1 and cells 7-9. Further, the "1" value at input 112 of cell 2 gates off P-channel switching transistor 116 and gates on N-channel switching transistor 130, thereby connecting common line 140 to ground and imposing a "0" value at output $OUT_1$. Outputs $OUT_1$ and $OUT_2$ are isolated from each other by the "off" state of N-channel switching transistor 126 in cell 2. The "0" values at inputs 112 of cells 0-1 and cells 6-9 gate off N-channel switching transistors 126 in those cells, isolating common line 140 from ground in those cells.

Thus, there is a propagation of the "1" value imposed on common line 140 in cell 6 to outputs $OUT_2$-$OUT_5$. Also, there is propagation of the "0" value imposed on common line 140 in cell 2 to outputs $OUT_0$-$OUT_1$, and to outputs $OUT_6$-$OUT_9$.

Figure 4:
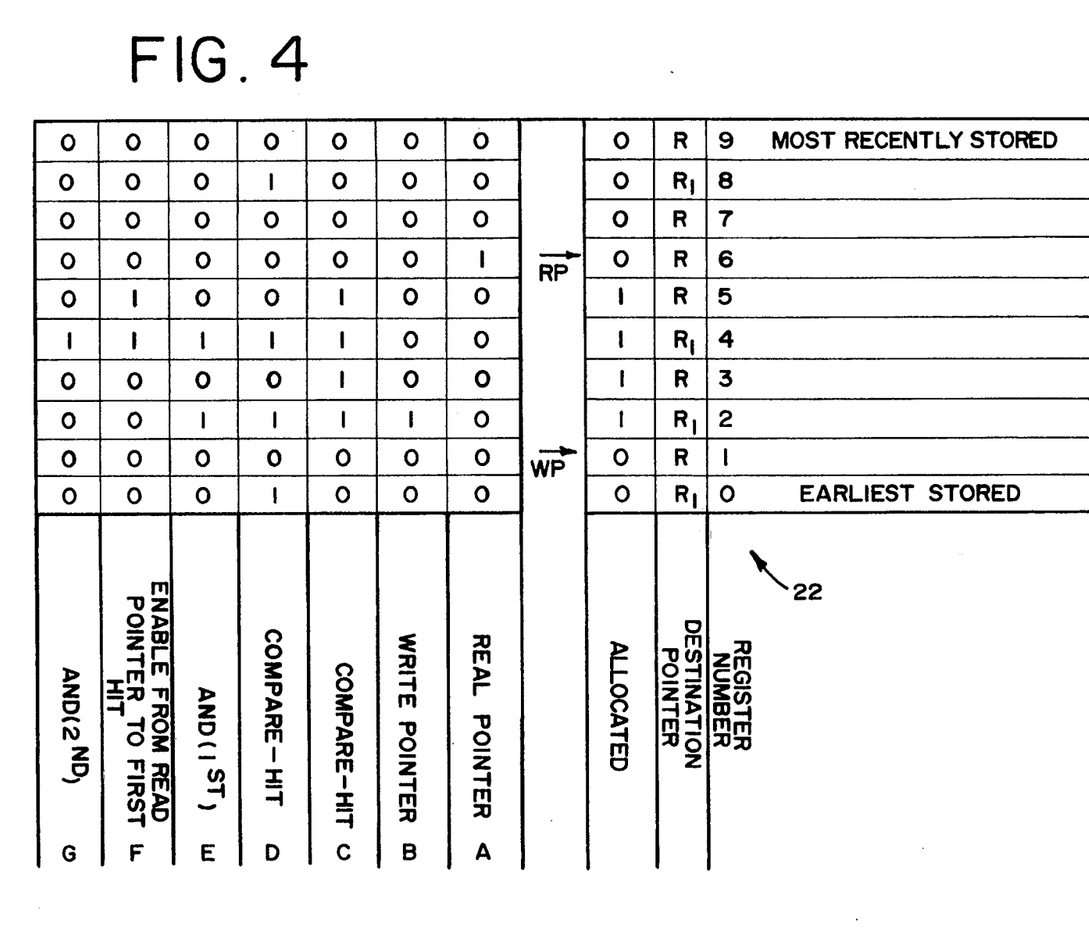
FIG. 4 is a schematic tabular representation of the method and operation of the enable circuit illustrated in FIG. 3.

FIG. 4 is a schematic tabular representation of the method and operation of ENABLE circuit 100 as illustrated in FIG. 3. In FIG. 4, selected values within a reorder buffer 22 are illustrated. Reorder buffer 22 is configured, preferably, as a loop first-in-first-out (FIFO) register with the direction of shifting of data within reorder buffer 22 accomplished by increasing the READ pointer and the WRITE pointer. A READ pointer (RP) and a WRITE pointer (WP) are illustrated in FIG. 4 at specific locations delineating a fetch-batch of four instructions within reorder buffer 22. Further in FIG. 4, letter designations "A"-"G" are keyed to the signal designations employed in connection with describing FIG. 2.

Reviewing FIG. 2 and FIG. 4 together, presume for purposes of illustration that information, such as an operand for an instruction, is required which is known to be located in register $R_1$ within register file 24 (see FIG. 1). The READ pointer RP establishes signal "A" as a "1" value adjacent the position of READ pointer RP in FIG. 4. Similarly, WRITE pointer WP establishes signal "B" as a "1" value adjacent the position of WRITE pointer WP in FIG. 4 Signal "C" the ENABLE signal for all entries intermediate READ pointer RP and WRITE pointer WP, assigns a "1" value within reorder buffer 22 for all entries intermediate READ pointer RP and WRITE pointer WP. Signal "D" represents the concurrence of a source indicator for information required by an instruction and a destination address containing a previously generated result within reorder buffer 22. Accordingly, each occurrence of register $R_1$ in the destination pointer column in FIG. 4 establishes a "1" value in column "D" of FIG. 4 Signal "E" representing concurrence of ENABLE signal "C" and COMPARE-HIT signal "D" establishes a "1" value for each concurrence of signals "D" and "C". Signal "F" is an ENABLE signal assigning a "1" value for all entries intermediate READ pointer RP and the first occurrence of a "1" value for signal "E". Signal "G" represents the concurrence of signals "E" and "F", as established by AND circuit 86 in FIG. 2. Thus, signal "G" identifies with a "1" value the most recently-stored occurrence of a destination register $R_1$ within reorder buffer 22 intermediate READ pointer RP and WRITE pointer WP.

It is to be understood that, while the detailed drawings and specific examples given describe preferred embodiments of the invention, they are for the purpose of illustration only, that the apparatus of the invention is not limited to the precise details and conditions disclosed and that various changes may be made therein without departing from the spirit of the invention which is defined by the following claims:

I claim:

1. An apparatus for resolving dependencies among a plurality of instructions within a storage device, said storage device having a plurality of memory cells and sequentially storing said plurality of instructions in selected memory cells of said plurality of memory cells, said storage device having a read pointer indicating a next-empty memory cell of said plurality of memory cells, and a write pointer indicating an earliest-stored instruction of said plurality of instructions; each of said plurality of instructions effecting operational combination of a plurality of operands to determine a result, each of said plurality of operands being identified by a source indicator, said result being identified by a destination indicator; the apparatus generating an output signal, said output signal identifying the most-recently stored instruction of said plurality of instructions having said destination indicator matching a respective said source indicator of a next-to-be-dispatched instruction, the apparatus comprising:

a compare-hit means for comparing said source indicators with said destination indicators; said compare-hit means generating a compare-hit signal upon each concurrence of said respective source indicator in said next-to-be-dispatched instruction with said destination indicator of an earlier-stored instruction of said plurality of instructions;

a first enable means responsive to said read pointer and to said write pointer for generating a first enable signal for a first packet of instructions of said plurality of instructions, said first packet of instructions being defined by said read pointer and said write pointer;

a first comparing means for generating a hit-enable signal for each concurrence of said compare-hit signal and said first enable signal;

a second enable means responsive to said read pointer and to said hit-enable signal for generating a second enable signal for a second packet of instructions of said plurality of instructions, said second packet of instructions being defined by said read pointer and said hit-enable signal; and a second comparing means for generating said output signal for each concurrence of said second enable signal and said hit-enable signal.

2. An apparatus for resolving dependencies among a plurality of instructions as recited in claim 1 wherein said sequential storing is effected as a first-in-first-out storage.

3. An apparatus for resolving dependencies among a plurality of instructions as recited in claim 2 wherein said first enable means and said second enable means are of substantially the same configuration.

4. An apparatus for resolving dependencies among a plurality of instructions as recited in claim 3 wherein said first comparing means and said second comparing means are of substantially the same configuration.

5. An apparatus for resolving dependencies among a plurality of instructions as recited in claim 1 wherein said first enable means and said second enable means are of substantially the same configuration.

6. An apparatus for resolving dependencies among a plurality of instructions are recited in claim 5 wherein said first comparing means and said second comparing means are of substantially the same configuration.

7. An apparatus for resolving dependencies among a plurality of instructions as recited in claim 1 wherein said plurality of operands is two operands.

8. An apparatus for resolving dependencies among a plurality of instructions as recited in claim 1 wherein said first comparing means and said second comparing means are of substantially the same configuration.

9. An apparatus for resolving dependencies among a plurality of instructions within a storage device, said storage device having a plurality of memory cells and sequentially storing said plurality of instructions in selected memory cells of said plurality of memory cells, each of said plurality of memory cells including a plurality of tags, each of said plurality of tags having a first value indicating enablement and a second value indicating non-enablement; said storage device having a read pointer indicating a next-empty memory cell of said plurality of memory cells, an a write pointer indicating an earliest-stored instruction of said plurality of instructions; each of said plurality of instructions effecting operational combination of a plurality of operands to determine a result, each of said plurality of operands being identified by a source indicator, said result being identified by a destination indicator; the apparatus setting an identification tag, said identification tag identifying the most-recently stored instruction of said plurality of instructions having said destination indicator matching a respective said source indicator of a next-to-be-dispatched instruction, the apparatus comprising:

a compare-hit means for comparing said source indicators with said destination indicators; said compare-hit means setting a compare-hit tag at said first value for a respective earlier-stored instruction of said plurality of instructions when there exists concurrence of said respective source indicator in said next-to-be-dispatched instruction with said destination indicator of said respective earlier-stored instruction;

a first enable means responsive to said read pointer and to said write pointer for setting a first enable tag at said first value for each instruction in a first packet of instructions of said plurality of instructions, said first packet of instructions comprising all instructions of said plurality of instructions stored intermediate said read pointer and said write pointer;

a first comparing means for setting a hit-enable tag at said first value for each said instruction of said first packet of instructions for which said compare-hit tag and said first enable tag are set at said first value;

a second enable means responsive to said read pointer and to said hit-enable tag for setting a second enable tag at said first value for each instruction in a second packet of instructions of said plurality of instructions, said second packet of instructions comprising all instructions of said first packet of instructions stored intermediate said read pointer and the earliest-stored instruction of said first packet of instructions having said hit-enable tag set at said first value; and a second comparing means for setting said identification tag for each instruction for which said second enable tag and said hit-enable tag are set at said first value.

10. A method for resolving dependencies among a plurality of instructions within a storage device, said storage device having a plurality of memory cells and sequentially storing said plurality of instruction in selected memory cells of said plurality of memory cells, said storage device having a read pointer indicating a next-empty memory cell of said plurality of memory cells, and a write pointer indicating an earliest-stored instruction of said plurality of instructions; each of said plurality of instructions effecting operational combination of a plurality of operands to determine a result, each of said plurality of operands being identified by a source indicator, said result being identified by a destination indicator; the method identifying the most-recently stored instruction of said plurality of instructions having said destination indicator matching a respective said source indicator of a next-to-be-dispatched instruction, the method comprising the steps of:

(1) comparing each said respective source indicator in said next-to-be-dispatched instruction with said destination indicator of each earlier-stored instruction of said plurality of instructions;

(2) generating a compare-hit signal upon each concurrence of said respective source indicator in said next-to-be-dispatched instruction with said destination indicator of an earlier-stored instruction of said plurality of instructions;

(3) generating a first enable signal responsive to said read pointer and to said write pointer for a first packet of instructions of said plurality of instructions, said first packet of instructions being defined by said read pointer and said write pointer;

(4) comparing said compare-hit signal with said first enable signal;

(5) generating a hit-enable signal for each concurrence of said compare-hit signal and said first enable signal;

(6) generating a second enable signal responsive to said read pointer and to said hit-enable signal for a second packet of instructions of said plurality of instructions, said second packet of instructions being defined by said read pointer and said hit-enable signal;

(7) comparing said second enable signal with said hit-enable signal; and (8) generating an output signal for each concurrence of said second enable signal and said hit-enable signal, said output signal identifying the most-recently stored instruction of said plurality of instructions having said destination indicator matching a respective said source indicator of said next-to-be-dispatched instruction.

11. A method for resolving dependencies among a plurality of instructions as recited in claim 10 wherein said sequential storing is effected as a first-in-first-out storage.

12. A method for resolving dependencies among a plurality of instructions as recited in claim 10 wherein said plurality of operands is two operands.

* * * * *